March 10, 1970 — W. R. ROOP — 3,499,465
MILKING MACHINES
Filed Feb. 8, 1967 — 3 Sheets-Sheet 1

INVENTOR,
William Roger Roop
BY Stone + Mack
ATTORNEYS.

March 10, 1970     W. R. ROOP     3,499,465

MILKING MACHINES

Filed Feb. 8, 1967     3 Sheets-Sheet 3

INVENTOR,
William Roger Roop,

BY Stone & Mack
ATTORNEYS.

United States Patent Office 3,499,465
Patented Mar. 10, 1970

3,499,465
MILKING MACHINES
William Roger Roop, Union Bridge, Md., assignor of one-third to Maurice Rhodes Zent, Keymar, Md.
Filed Feb. 8, 1967, Ser. No. 614,676
Int. Cl. A01j 5/10
U.S. Cl. 137—624.13
3 Claims

ABSTRACT OF THE DISCLOSURE

This invention relates to an improved pulsator for milking machine operated by suction in which there is one or more suction chambers containing a rotatable disc serving to periodically couple a chamber with suction or to the atmosphere to effect a relief of suction, the mechanism including in each chamber a rotatable disc closely fitting the inner periphery of a suction chamber and having holes therethrough, said disc being adapted to rotate over the floor of the respective chamber and which has openings therethrough leading to the atmosphere or to the port for connection with the vacuum side. The foregoing mechanism is duplicated with a common drive when it is desired to provide perfect balance and a desired ratio as between the demand on the front and rear teats.

---

This invention relates to a pulsator for milking machine and to features thereof whereby a maximum of milk may be drawn from a cow and with the least discomfort to the cow. One feature of this improvement pertains to new pulsators coupled to the suction device.

It is known that the rear teats of a cow produce more milk than the front teats. With that factor in mind, one pulsator of a pair of pulsators is designed to milk the rear teats on a 60-40 basis. The two pulsators are driven by a single motor as for example one 6 r.p.m. motor. One of the pulsators is designed to milk the rear teats at about a 60:40 ratio. Forty percent of the time will be in the rest or massage period. The other pulsator will milk the front teats at a 50:50 ratio in accordance with which fifty percent of the time it will be drawing milk and fifty percent of the time it will be in the rest or massage period.

There are preferably seven openings in the vacuum chamber and by using the 6 r.p.m. shaft a pulsation rate of 42 times per minute is obtainable.

Each pulsator includes a vacuum chamber in which there is a disc having two holes. The purpose of each disc is to control the flow of air as the disc rotates over the floor of the chamber. The hole nearest to the center passes over the opening in the floor of the vacuum chamber and this allows the air to be drawn out of the area between the chamber and the source of suction. This opens the inflation and it is now in the milk phase. Vacuum is applied to the rear teats and the milk is drawn out. The hole in the disc passes over the openings in the vacuum chamber floor and closes the flow of air. Immediately the hole in the disc nearest to the periphery of the disc passes over the opening in the floor of the chamber. It permits the atmospheric air to enter and collapse the inflation, thereby shutting off the vacuum applied to the teat for drawing the milk. This closure on the teat also massages the blood out of the tissue of the teat.

"Inflation" is a rubber sleeve surrounding a teat and is within the shell. By allowing the atmospheric pressure in the area between the outer wall of the inflation and the inner wall of the shell, in co-operation with the continual vacuum on the inside of the inflation, this closes the inflation below the teat end thereby shutting off the vacuum from the teat.

With this arrangement the timing on the pulsators is set so that when the front teats are in the rest phase, the rear teats will be milking. There will be a slight overlap of the rear teat milking when the front teats begin their milk phase. It will provide alternate rear teats milking while front teats rest for a period, followed by front teats milking while rear teats rest for a period.

The size of the hole in the rotating disc will vary as to the number of cows being milked at any one time. Provision for varying the size of the hole or holes may be accomplished by having available discs providing holes of different size.

The foregoing operation of the rotating disc in the respective vacuum chambers is made possible by a driven shaft in each chamber secured to the respective disc in said chamber and which extends through the top of each chamber, a driven wheel above each chamber mounted on the driven shaft above the top, and common drive means for both discs including a central shaft extending vertically and having a common drive wheel for both said driven wheels and secured to the central shaft, and a motor connected to said central shaft. It will be clear that no milk enters the pulsator.

The foregoing and additional details of construction will be described and claimed in the following specification and claims when considered in conjunction with the accompanying drawings, in which:

Figure 2:
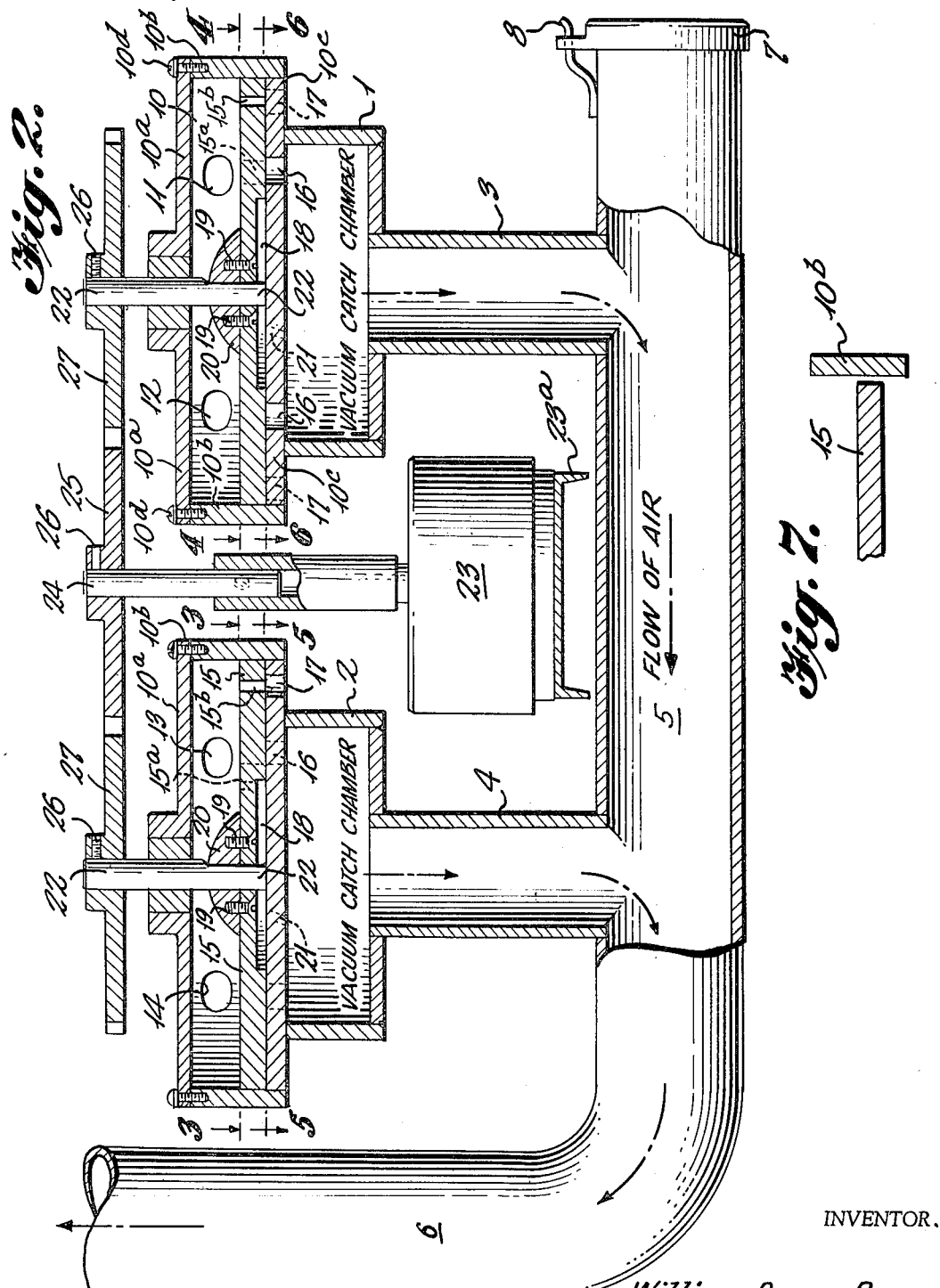
FIG. 2 is a vertical section on the line 2—2 of FIG. 1.
Figure 6:
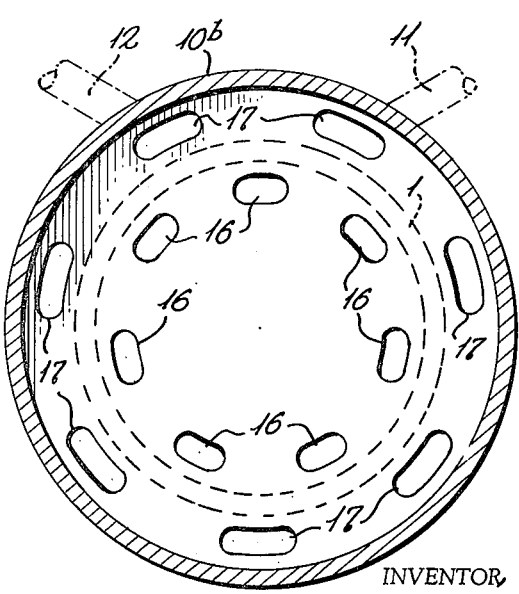

FIG. 6 is a view of the floor of the pulsator vacuum chamber at the right side of FIG. 2 looking down at the holes leading respectively to the catch chamber and atmosphere; and FIG. 7 is an enlarged fragmentary view showing the peripheral portion of the disc 15 adjacent the inner surface of the wall 10$^b$ whereby the edge of the disc is closely adjacent the inner surface of the wall 10$^b$ but sufficiently far apart to permit rotation of the disc 15 adjacent to the inner surface of the wall 10$^b$.

Figure 1:
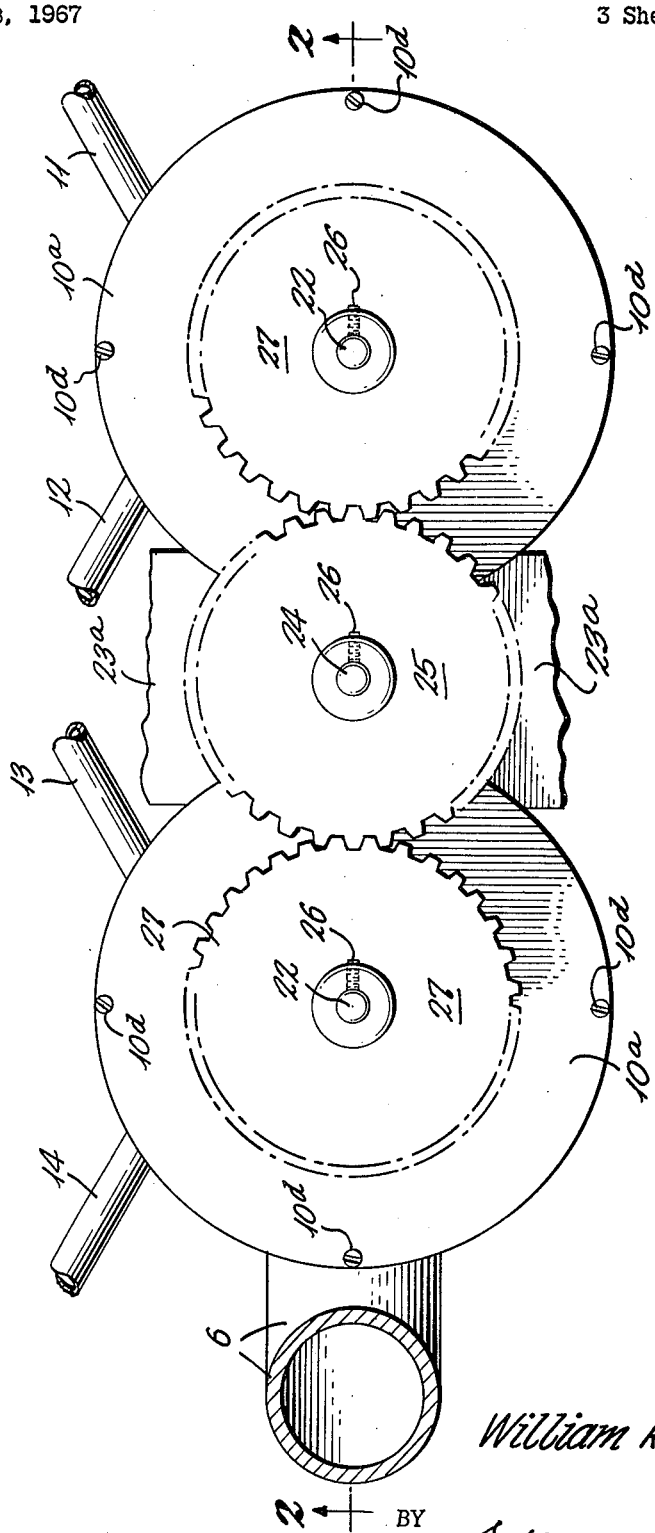
FIG. 1 is a top or plan view looking downward on the milking machine having incorporated therein the improved pulsators of this invention and showing the gear wheels thereof.

FIG. 1 of the drawings shows a top plan view illustrating the general arrangement of the pulsators with a common drive wheel and pipes communicating with the conventional mechanism to be secured to the teat milking end of a suction milker.

The mechanism for operating the pulsators for controlling the amount of suction and the period devoted to suction and/or rest will be understood from FIG. 2 which is a vertical section taken on the line 2—2 of FIG. 1. In FIG. 2 the support and strength provided for the moving parts of the apparatus include a catch chamber 1 for vacuum connected at its bottom through a down pipe 3 leading from the pulsator at the right in FIGS. 1 and 2. The catch chamber serves to conserve the vacuum and return its influence to the vacuum pump. A corresponding catch chamber 2 is indicated at the left side of FIG. 2 and that chamber opens downwardly through a pipe 4. Both of these pipes 3 and 4 connect through the pipe 5 and lead the suction to the left as shown in FIG. 2 and outwardly through a pipe 6 to the vacuum pump. At the lower right hand end of the pipe 5 is a cleanout door 7 having a spring catch 8 to normally hold the door shut. The upper edges of the side walls of chambers 1 and 2 are firmly united with the under surface of the floor of the pulsator mixing chambers 10 so as to maintain suction, as will now be described.

Each pulsator contains a pulsator vacuum chamber 10 having a cover plate 10ª, a side wall 10ᵇ and a floor member 10ᶜ. A cover plate 10ª is held in place at the top of the side wall 10ᵇ by means of screws 10ᵈ which pass through the cover plate 10ª and into the top of the side wall 10ᵇ. The floor member 10ᶜ has a plurality of openings therethrough which lead either to the catch chambers 1 and 2 or to the atmosphere. These openings are arranged in two concentric rows, the innermost ones of which conduct air flow to the catch chamber and the outer row of which openings leads to the atmosphere as will be noted from FIGS. 2, 5 and 6. It will also be noted that the upper edge of the side walls 1 and 2 of the catch chamber are positioned between the rows of openings 16 and 17 as will be noted from FIGS. 2, 5 and 6. Connecting means between each pulsator and the claw (not shown) or the teat suction cups (also not shown) is represented by the ports 11 and 12 from the vacuum chamber in the side wall 10ᵇ and which ports are indicated at 11 and 12 in the right hand pulsator as connected to the front teats and by 13 and 14 in the left hand pulsator as shown in FIG. 2 and in FIGS. 6 and 5 respectively as connected to the rear teats.

Figure 5:
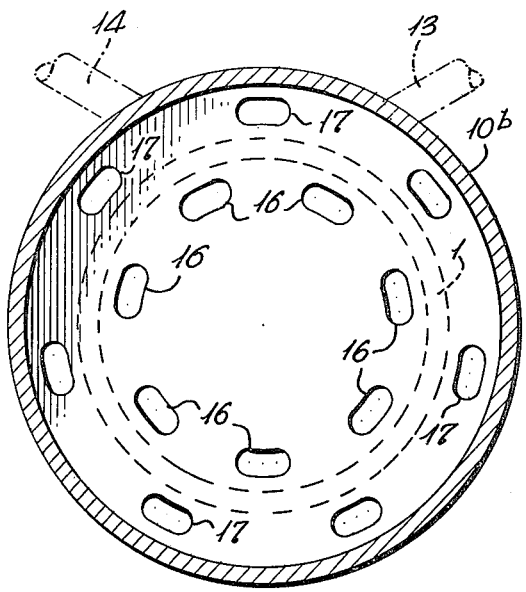
FIG. 5 is a view of the floor of the pulsator vacuum chamber at the left side of FIG. 2 looking down at the holes leading respectively to the catch chamber and atmosphere.

It will be noted that the size of the openings 17 in the pulsator shown at the right in FIG. 6 are larger in area than those of openings 16 as shown in the inner circle of FIG. 6 and throughout all openings in FIG. 5.

Means for controlling the periodic opening and closing of the ports 16 and 17 is controlled by a rotatable disc 15 located immediately above the upper surface of the floor member 10ᶜ of the pulsator mixing chamber 10. This disc 15 is provided with two openings therethrough, 15ª and 15ᵇ, whereby communication may be established between the chambers 10 and through the openings 16 and 17 in the floor 10ᶜ of the pulsator vacuum chamber. The disc 15 rests on the floor 10ᶜ and is rotated with a snug fit against the inner surface of the side wall 10ᵇ. The disc 15 is rotated under the influence of a drive shaft 22 extending downwardly and terminating with its lower end at the upper surface of the floor plate 10ᶜ as will be described.

The under surface of the disc 15 at the center portion thereof is recessed approximately one-sixteenth of an inch for a distance of approximately one inch on each side of the axial center of the drive shaft 22. A recessed area is indicated at 18. Extending upwardly from the surface of the fiber disc are a plurality of screws passing through the upper portion of the disc 15 and into a floating collar 20 on the drive shaft 22. The drive shaft 22 and collar 20 and disc 15 are adapted to slide up or down on the drive shaft 22. Immediately beneath the recessed area 18 in disc 15 there is a drain hole 21 leading through the bottom plate 10ᶜ and into the catch chamber for removal of any condensation or any moisture.

Mechanism for rotating the disc 15 so as to bring the openings 15ª and 15ᵇ in the disc 15 into registry with the ports 16 and 17 is provided from a motor 23 supported on a base member 23ª and which motor has an upwardly extending driven shaft 24 at the upper end of which is a gear wheel 25. Driven gears 27 are located at the upper end of the shafts 22 and the teeth at the periphery thereof are meshed with the teeth on the gear wheel 25 so that power from the motor 23 is transmitted through those gears to the shafts 22 and the discs 15.

Figure 3:
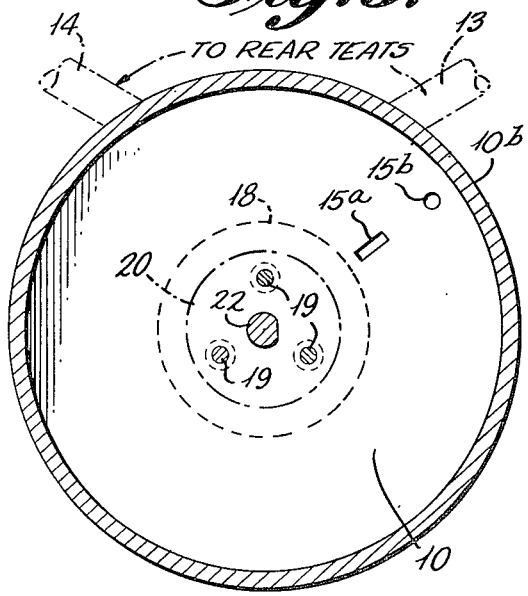
FIG. 3 is a plan view of the rotatable disc shown at the left side of FIG. 2.
Figure 4:
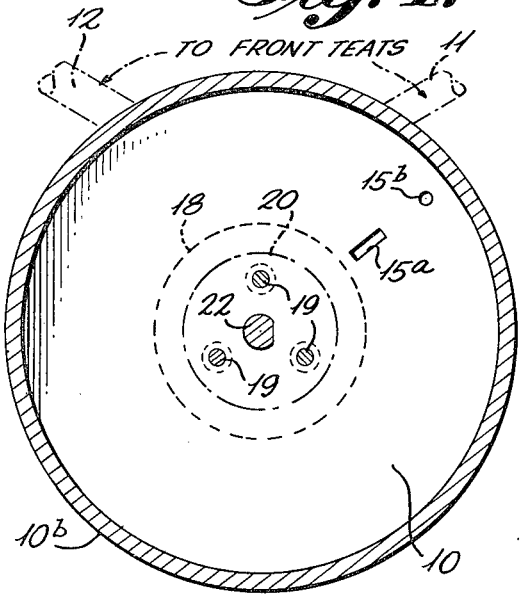
FIG. 4 is a plan view of the rotatable disc shown at the right side of FIG. 2.

Referring to FIG. 3, it will be noted that there is a slot indicated at 15ª and a hole indicated at 15ᵇ. These openings are adapted to register with the openings 16 and 17 respectively during the rotation of the disc 15 on the upper surface of the floor 10ᶜ of the pulsator mechanism shown at the left in FIG. 2. Similarly in FIG. 4 the openings 15ª and 15ᵇ are moved during the rotation of the disc so as to pass respectively over the opening 16 leading to the catch chamber 1. The opening 15ᵇ as shown in FIG. 4 is slightly smaller than the opening 15ᵇ in FIG. 3 and is intended to serve for two units. The opening 15ᵇ in the left hand pulsator in FIG. 3 provides communication of greater area for four units.

Referring to FIG. 2 and the gear wheels 27, it will be observed that the hub portion of the three gear wheels are thickened and that set screws 26 are used in the hub portion for securely fastening the gear wheels on their respective drive shafts. It will also be observed that the top cover plate 10ª of the pulsator mixing chamber 10 is provided with a sealed bearing which is pressed on to provide a tight fit for the shafts 22. Preferably this packed and sealed bearing is provided within a collar added to the cover plate 10ª.

I claim:

1. A pulsator mechanism for use with a milking machine comprising a pair of chambers each having an inner circular side wall and top and bottom walls, each side wall having ports adapted to be connected with a milking machine, each bottom wall being provided with a pair of spaced circular rows of openings, one circular row of openings being in communication with a source of vacuum pressure and the other circular row of openings being in communication with atmospheric pressure, a rotatable circular disc in each chamber below the ports in the side wall having spaced openings therein, one opening in the disc adapted to be aligned with an opening in one of said row of openings communicating with a source of vacuum pressure and the other opening in the disc adapted to be aligned with an opening in said row of openings in communication with atmospheric pressure and means for rotating the discs whereby the interior of each chamber above the disc is alternately subjected to vacuum and atmospheric pressure for control of a milking machine through said ports in the side walls.

2. A pulsator mechanism for use with a milking machine and of the type defined in claim 1 having two chambers with the bottom walls thereof provided with ports connected periodically to atmosphere, the ports in one of said chambers having a greater total area of such slots than the area of such slots in the second of said chambers.

3. A pulsator mechanism for use with a milking machine and of the type defined in claim 1, said machine having two chambers each with the bottom walls thereof having slotted openings leading to atmosphere, the slotted openings in one of said chambers being longer than the length of the slotted openings in the second of said chambers whereby the total area of such slots in the first of said chambers is greater than the total area in the second of said chambers.

References Cited

UNITED STATES PATENTS

| | | | |
|---|---|---|---|
| 1,155,131 | 9/1915 | Cockburn | 119—14.37 |
| 1,400,792 | 12/1921 | Blackmore | 119—14.37 |
| 2,467,512 | 4/1949 | Weiby | 119—14.41 X |

HUGH R. CHAMBLEE, Primary Examiner

U.S. Cl. X.R.

119—14.41; 137—609, 624.18, 625.21